Aug. 8, 1944.  J. H. HOLSTEIN  2,355,534
LOADING DEVICE
Filed Dec. 19, 1942  12 Sheets-Sheet 5

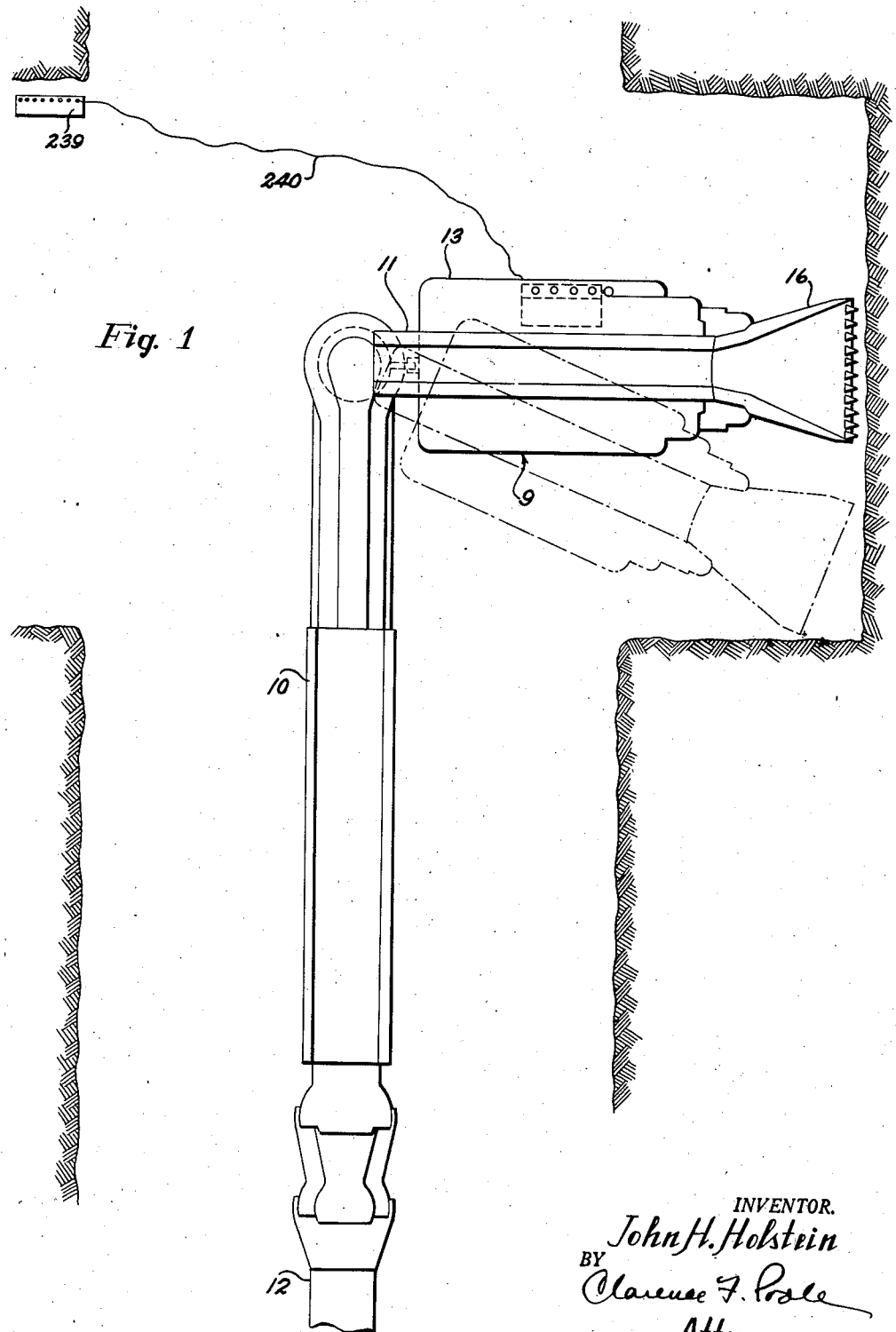

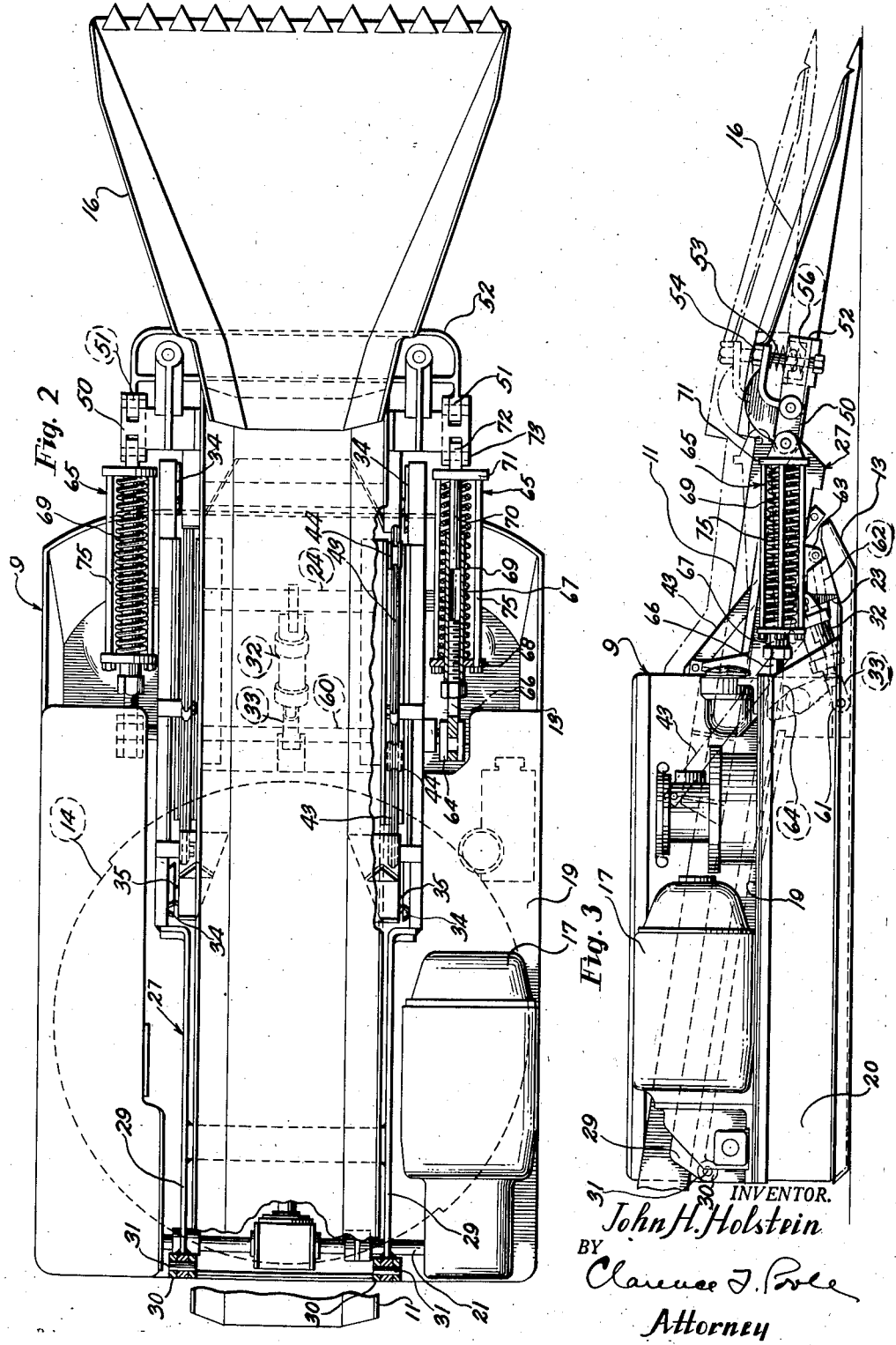

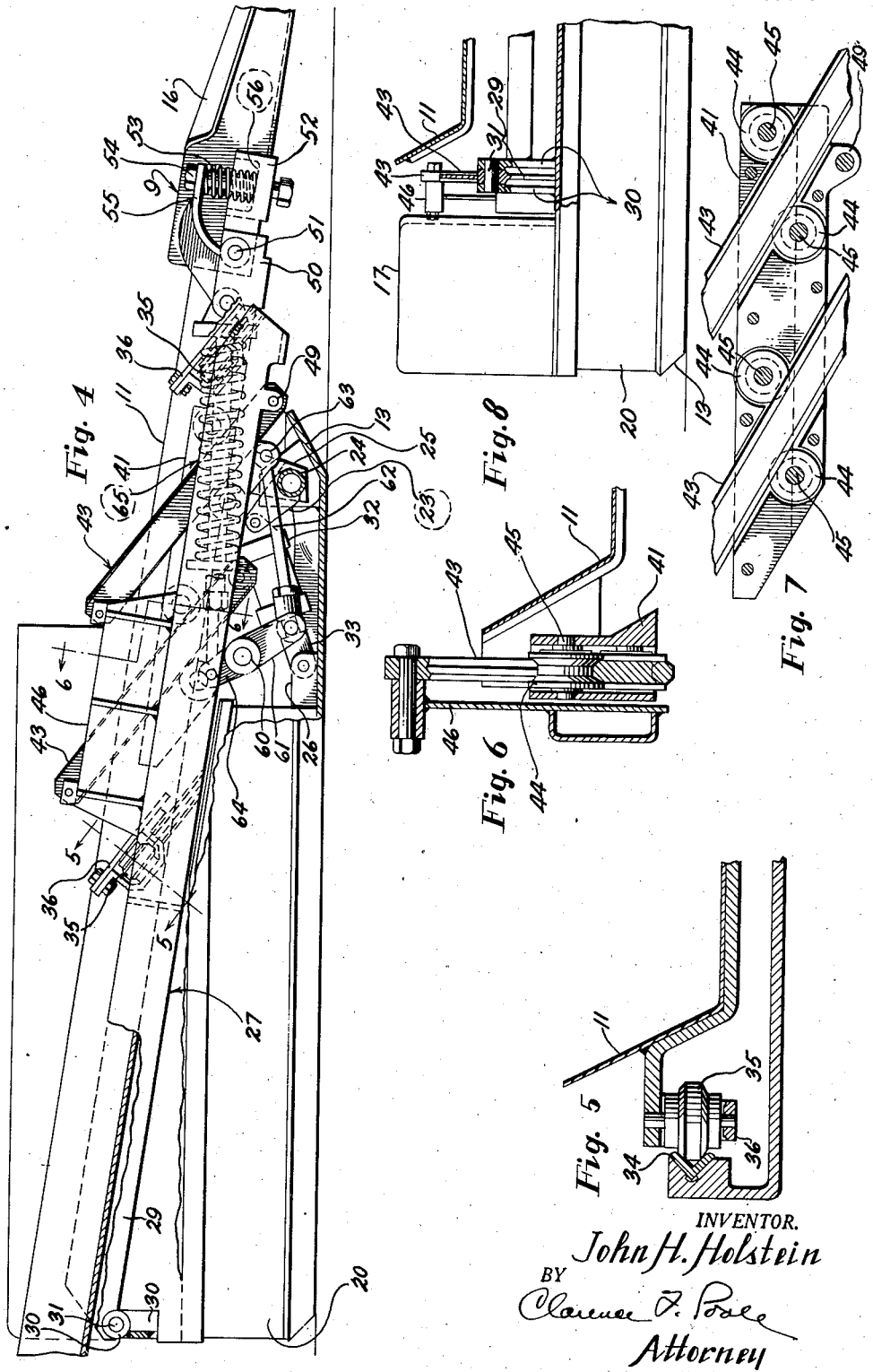

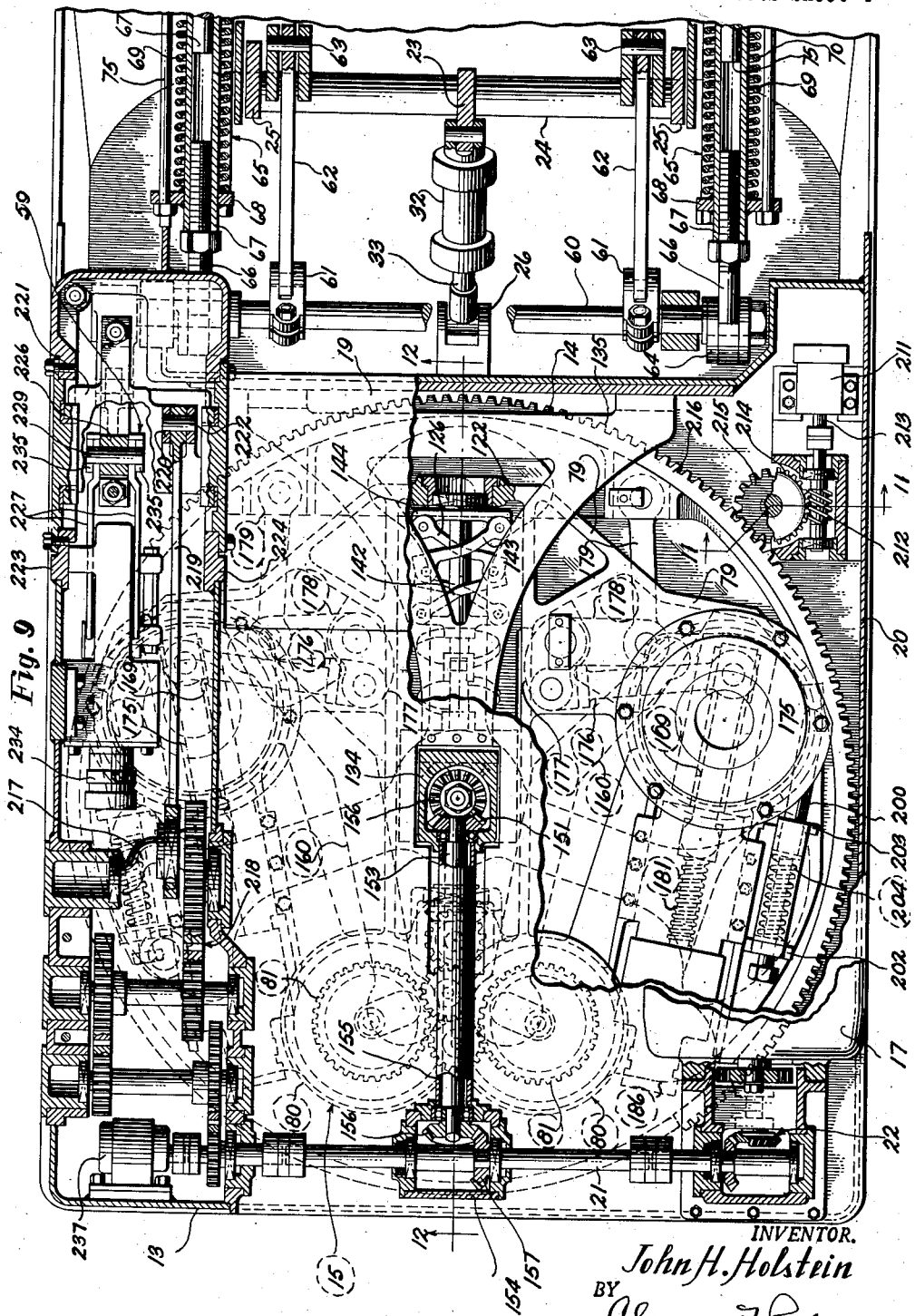

INVENTOR.
John H Holstein
BY Clarence F. Poole
Attorney

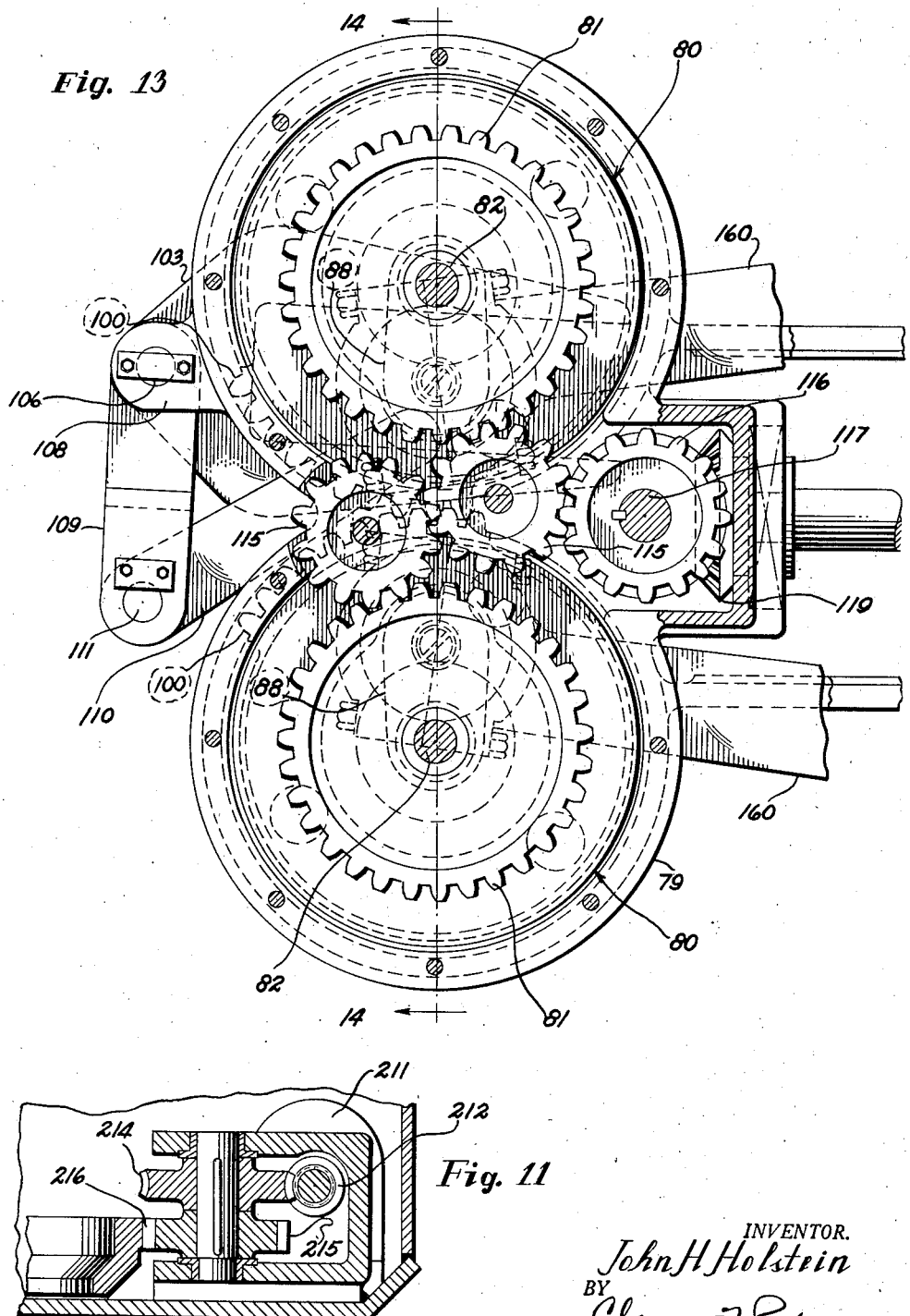

Aug. 8, 1944.  J. H. HOLSTEIN  2,355,534
LOADING DEVICE
Filed Dec. 19, 1942   12 Sheets-Sheet 7
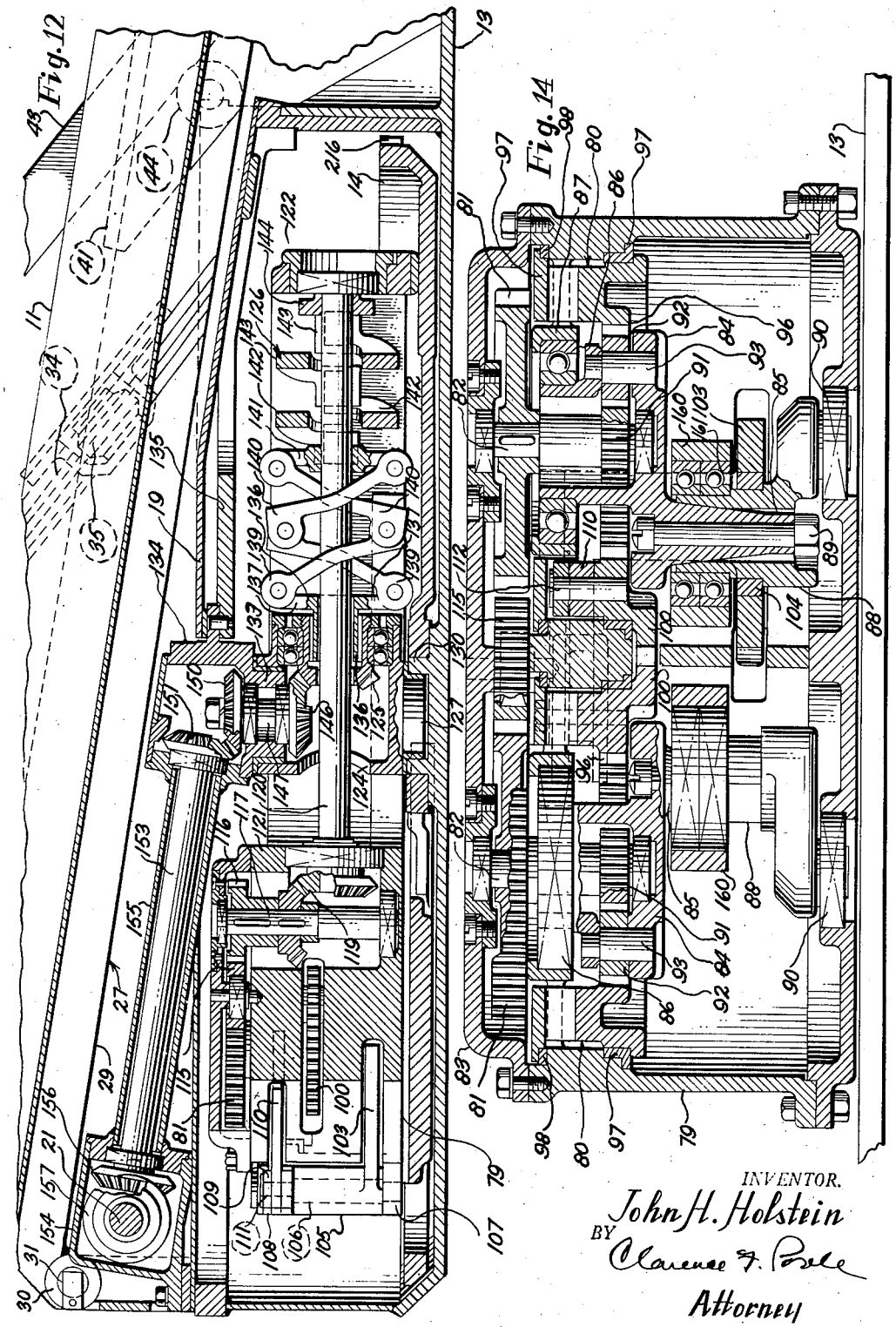
INVENTOR.
John H. Holstein
BY Clarence F. Poole
Attorney Aug. 8, 1944.  J. H. HOLSTEIN  2,355,534
LOADING DEVICE
Filed Dec. 19, 1942  12 Sheets-Sheet 8
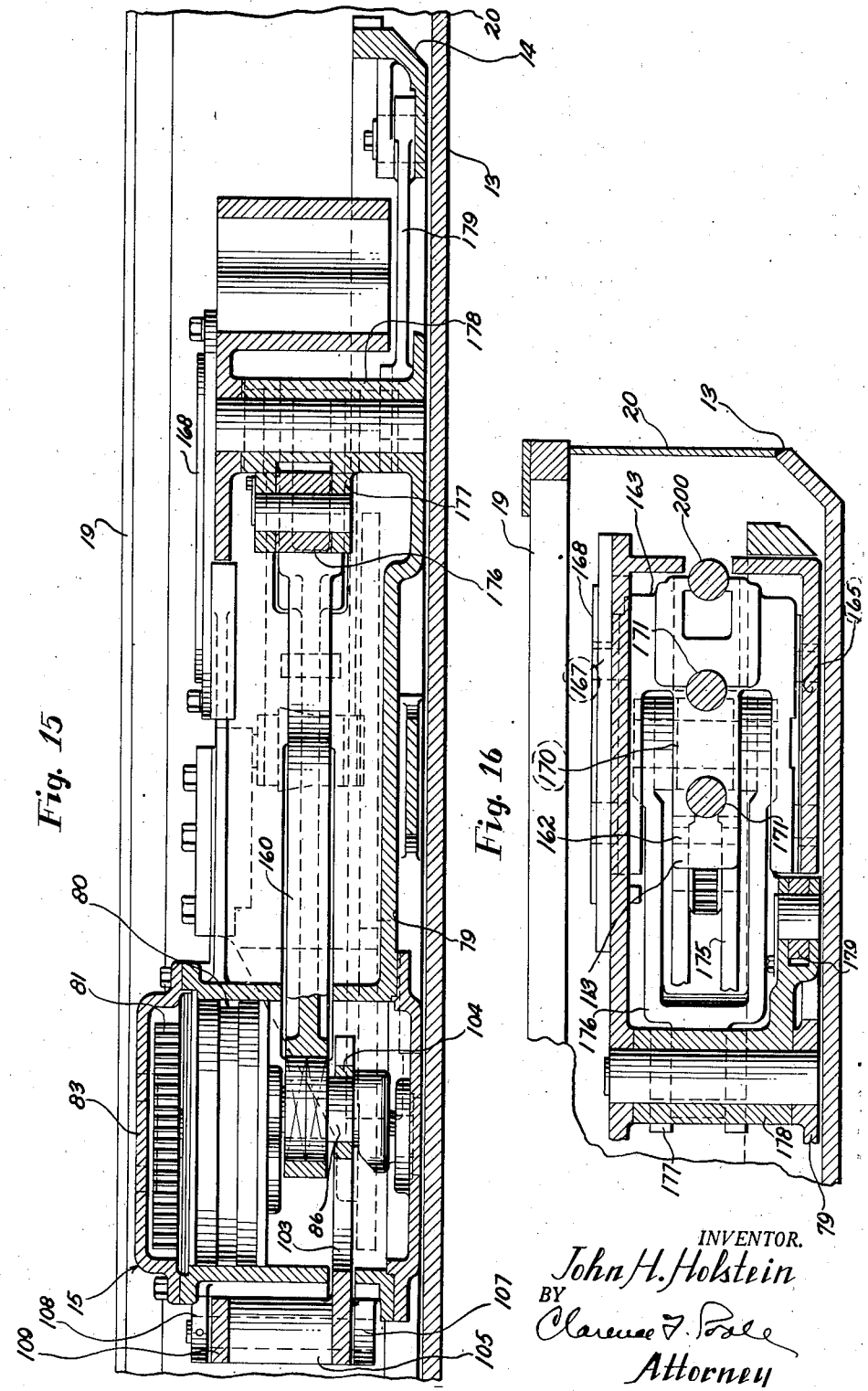
INVENTOR.
John H. Holstein
BY
Clarence F. Poole
Attorney

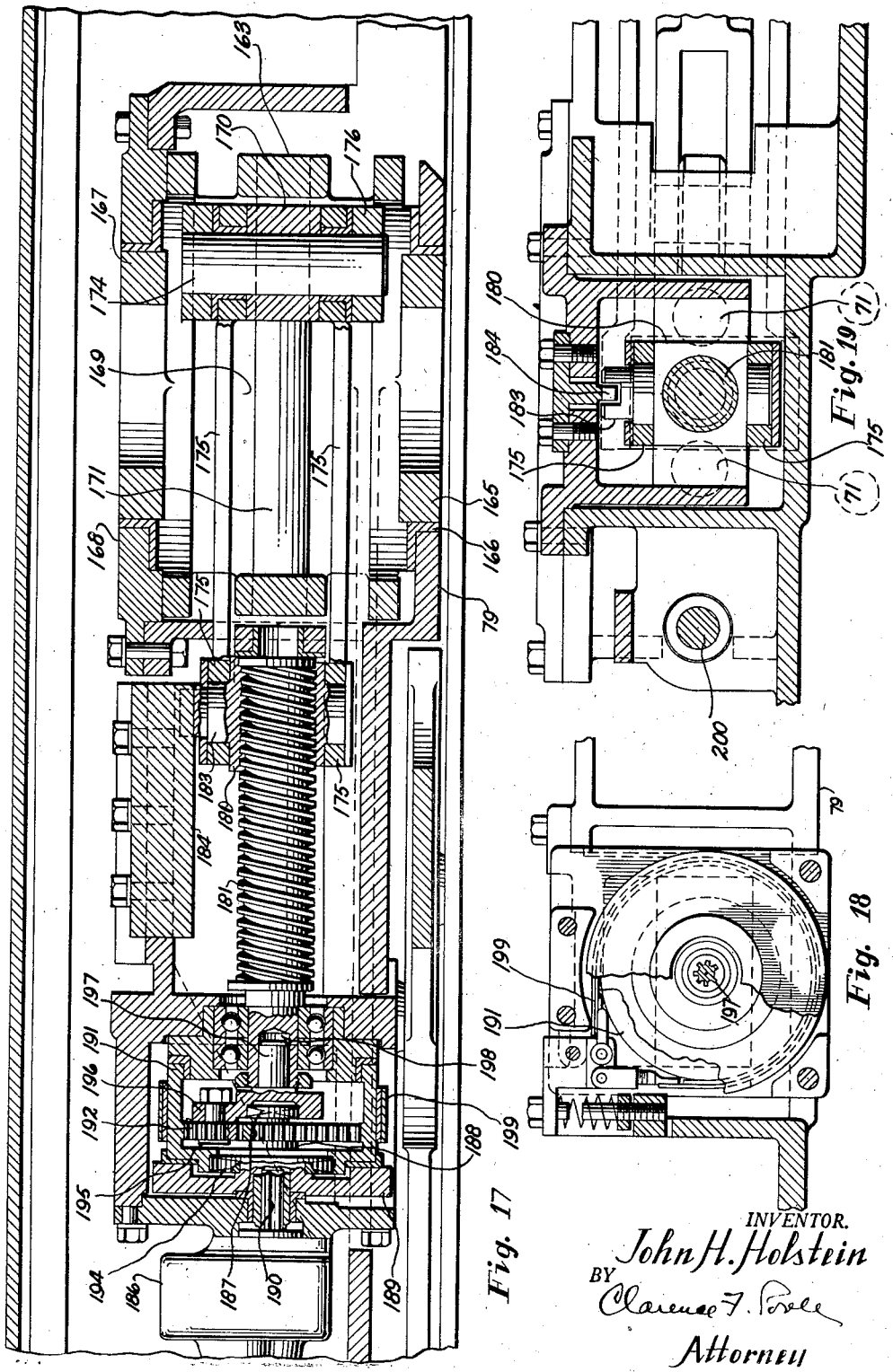

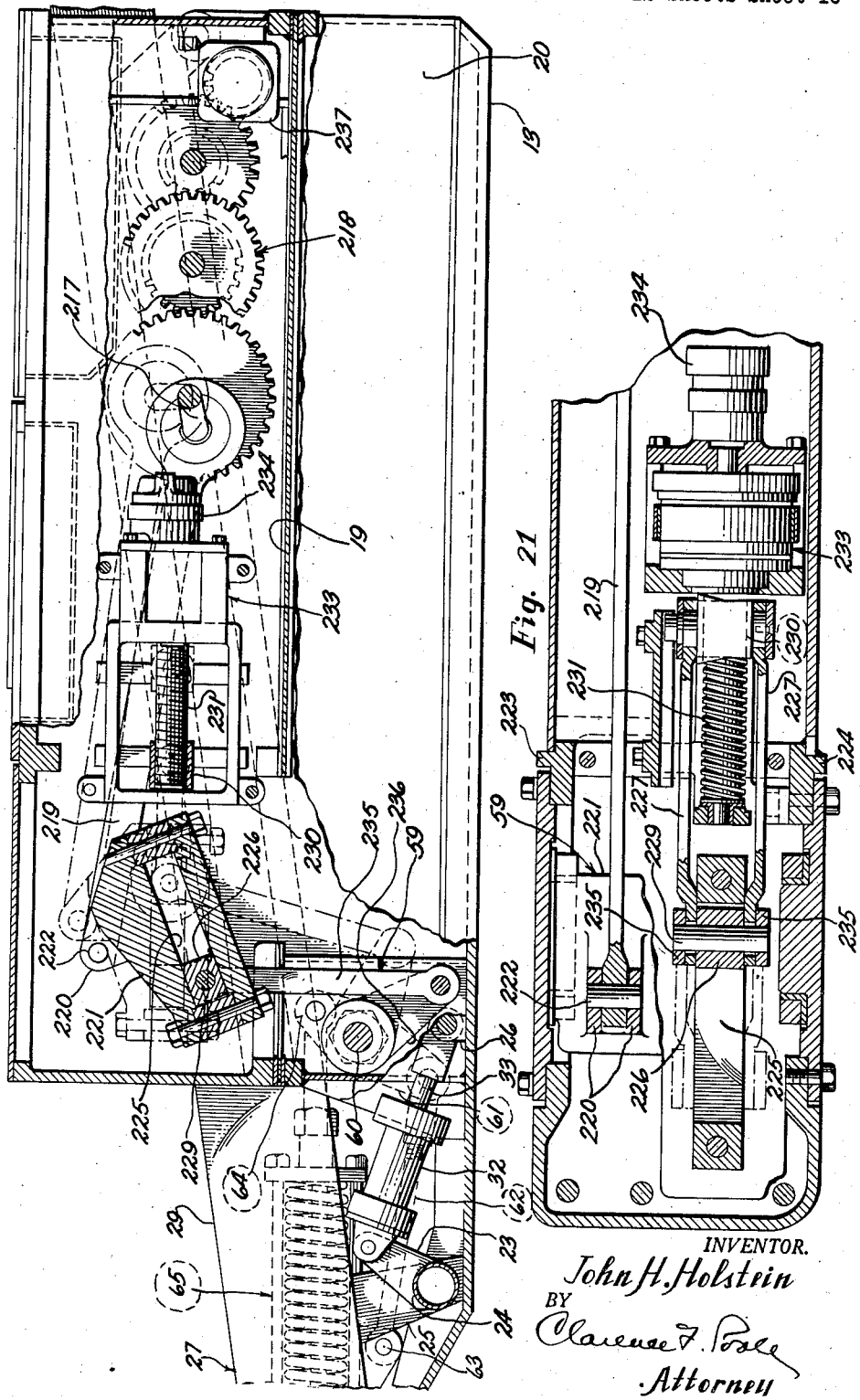

Patented Aug. 8, 1944

2,355,534

UNITED STATES PATENT OFFICE 2,355,534

LOADING DEVICE

John H. Holstein, Chevy Chase, Md., assignor to Goodman Manufacturing Company, Chicago, Ill., a corporation of Illinois Application December 19, 1942, Serial No. 469,508

35 Claims. (Cl. 198—220)

This invention relates to improvements in loading devices and more particularly relates to a loading device adapted to pick up and load material onto the inby end of a conveyer.

The principal objects of my invention are to provide a new and improved loading device of the class described particularly adapted for use in mines underground and arranged with a view towards compactness and ease and efficiency in operation and control.

In carrying out my invention I provide a base mounted on the ground for slidable movement therealong and mount a reciprocating trough section having a shovel on its forward end on this base for picking up loose material from the ground and loading it onto a conveyer. I also provide a turntable on this base with a reciprocably driven propelling device mounted on the turntable and driven in a definite phase relation with respect to the reciprocating trough section, for positively feeding the shovel into the material it is desired to load, by the inertia of said propelling device.

The general principles of construction and operation of my invention are somewhat similar to those shown and described in application Ser. No. 432,436, filed by William W. Sloane on February 26, 1942. My present invention, however, differs from the aforesaid Sloane application in that the propelling device is mounted on a turntable to aid in controlling the direction of movement of the base, and consists in a reciprocating drive mechanism slidably mounted on the turntable, together with a control means therefor, whereby the drive mechanism reciprocably driven on the turntable may serve as a propelling device, to effect feeding and withdrawing of the shovel from the material it is desired to load. The reciprocable drive mechanism may also be utilized for propelling the base bodily along the ground selectively in a forward or reverse direction, and to aid in swinging the turntable and base in various angular positions, for propelling the base in various directions, as will hereinafter more fully appear.

Other objects of my invention will appear from time to time as the following specification proceeds and with reference to the accompanying drawings wherein:

Figure 1 is a diagrammatic plan view of a section of a mine showing a loading device constructed in accordance with my invention, in position to pick up material from a breakthrough, which is being mined to connect two adjoining rooms of the mine;

Figure 2 is an enlarged plan view of the loading device shown in Figure 1;

Figure 3 is a view in side elevation of the loading device shown in Figure 2, drawn to a somewhat smaller scale than Figure 2;

Figure 4 is an enlarged fragmentary view in side elevation of the loading device, with certain parts broken away and certain other parts shown in longitudinal section in order to more clearly show certain details of the reciprocating trough and support and drive means therefor;

Figure 5 is an enlarged fragmentary sectional view taken substantially along line 5—5 of Figure 4;

Figure 6 is an enlarged fragmentary sectional view taken substantially along line 6—6 of Figure 4;

Figure 7 is an enlarged detail view showing certain details of the mounting of the counterweight, for counterbalancing the effect of the reciprocating action of the reciprocating trough section and shovel on the base;

Figure 8 is an enlarged detail partial rear end view drawn to substantially the same scale as Figure 4 and illustrating certain details of the mounting of the reciprocating trough section on the base;

Figure 9 is an enlarged plan view of the device shown in Figure 1, with the reciprocating trough section and top gear cover removed, and with certain other parts broken away and shown in section;

Figure 11 is a detail fragmentary sectional view taken substantially along line 11—11 of Figure 9 and illustrating certain details of the turntable drive;

Figure 12 is an enlarged fragmentary longitudinal sectional view taken substantially along line 12—12 of Figure 9;

Figure 13 is an enlarged detail plan view of the reciprocating drive mechanism with certain parts broken away and certain other parts shown in horizontal section;

Figure 14 is an enlarged transverse sectional view taken substantially along line 14—14 of Figure 13;

Figure 15 is an enlarged fragmentary sectional view taken substantially along line 15—15 of Figure 10;

Figure 16 is an enlarged fragmentary transverse sectional view taken substantially along line 16—16 of Figure 10;

Figure 17 is an enlarged fragmentary longitudinal sectional view taken substantially along line 17—17 of Figure 10;

Figure 18 is an enlarged fragmentary transverse sectional view taken substantially along line 18—18 of Figure 10;

Figure 19 is an enlarged transverse sectional view taken substantially along line 19—19 of Figure 10;

Figure 20 is an enlarged detail fragmentary longitudinal sectional view showing certain details of the reciprocating drive to the reciprocating trough section;

Figure 10:
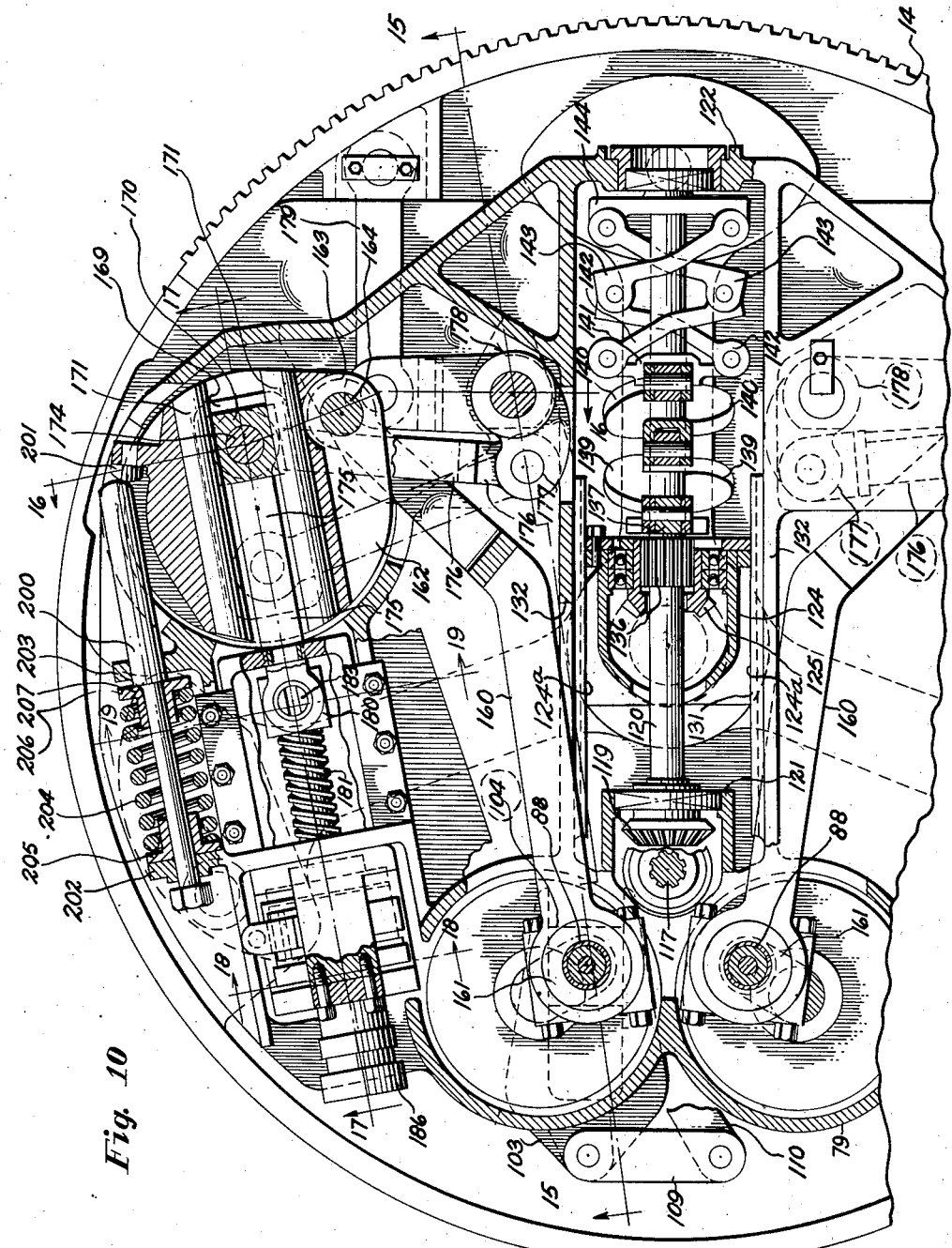
Figure 10 is an enlarged fragmentary plan view somewhat similar to Figure 9, but drawn to an enlarged scale and with certain other parts broken away and in section than are shown in Figure 9.

Figure 21 is an enlarged fragmentary detail plan view, with certain parts broken away and certain other parts shown in horizontal section, in order to illustrate certain details of the stroke control means for the reciprocating drive for the reciprocating trough section; and Figures 22, 23, 24 and 25 are diagrammatic views illustrating certain positions of the linkage connections to the propelling device for causing the propelling device to move in the proper directions and phase relationships, to propel the loading device in various desired directions along the ground.

Like reference characters refer to like parts throughout the various figures.

Referring now in particular to the embodiment of my invention illustrated in the drawings, a loading device indicated generally by reference character 9 is shown in Figure 1 as being in position for loading from a breakthrough connecting two parallel working places or rooms of a mine together. An extensible and swiveled connecting trough 10 may be pivotally connected to the rear end of the loading device for receiving material discharged from the rear end of a reciprocating trough section 11 of the loading device, and for transferring it to the inby end of a conveyer generally indicated by reference character 12.

The conveyer may be of any well known form, but is herein shown as being a shaker conveyer and consists of a trough line driven from suitable reciprocating drive mechanism (not shown). Said drive mechanism is preferably located adjacent the mine entry, and is arranged to reciprocably drive the conveyer trough line so as to cause material to move away from the working face of the room to the entry, where it may be loaded into suitable mine cars or the like.

The loading device includes generally a base 13 mounted for slidable movement along the ground on its bottom and having a turntable 14 mounted thereon, with a reciprocating inertia propelling device 15 guided for slidable movement on said turntable, for reciprocable movement with respect thereto whereby the impelling forces of said propelling device may be directed in various desired directions and at various intensities, for moving said base along the ground, and for feeding a shovel 16 on the forward end of the reciprocating trough section 11 into the material it is desired to load.

A motor 17 is provided for driving said reciprocating trough section and for reciprocably moving said inertia propelling device along said turntable. Said motor, as herein shown, is mounted on a cover 19 extending over said turntable and inertia device and mounted on opposite side walls 20, 20 of said base. Said motor extends longitudinally along one side of said base and is operatively connected with the drive mechanism for reciprocably driving the trough section 11, and with the inertia device by means of a transverse shaft 21 which is driven from said motor through a spur and bevel gear reduction generally indicated by reference character 22. The drive from said transverse shaft to said reciprocating trough and to said inertia device will be more clearly described as this specification proceeds.

The reciprocating trough section 11 is mounted on the base 13 on a vertically adjustable frame 27. Said frame includes a pair of parallel spaced side frame members 29, 29 extending along opposite sides of said reciprocating trough section, and connected together adjacent their forward and rear ends. Said side frame members are pivotally mounted at their rear ends between laterally spaced pairs of upright supports 30, 30 on pivotal pins 31, 31. Said upright supports are mounted on and project upwardly from the cover 19 for the base 13, adjacent the rear end thereof.

The frame 27 extends forwardly from said supports in a downwardly inclined direction beyond the forward end of said base. A fluid cylinder 32 is provided to pivot said frame and the trough 11 about the axes of the pivotal pins 31, 31, to elevate the shovel 16. Said fluid cylinder, as herein shown, is pivotally connected at its head end to the end of an arm 23 disposed centrally of said frame and mounted on and extending upwardly from a transverse tube 24 secured at its ends to brackets 25, 25 depending from the side frame members 29, 29 and forming stops to limit downward movement of said frame and said trough 11. Said cylinder has a piston movable therein (not shown) with a piston rod 33 extending therefrom, which is pivotally connected at its outer end to a bracket 26 extending upwardly from the base 13 adjacent its longitudinal center line and adjacent the forward end of said base, so that when fluid under pressure enters the head end of said cylinder, the frame 27 will be elevated about the pivotal pins 31, 31. The mounting for the reciprocating trough section 11 on the frame 27 includes a pair of longitudinally spaced upwardly inclined V-shaped guide tracks 34, 34 mounted on the inner side of each side frame member 29, one of said guide tracks being disposed adjacent the forward end of each side frame member and the other being spaced rearwardly therefrom. Said guide tracks are adapted to be engaged by rollers 35, 35 having V-shaped outer faces and pivotally mounted in brackets 36, 36 projecting laterally from opposite sides of the reciprocating trough 11. The reciprocating trough 11 is thus reciprocably supported on the frame 27, to move in a downwardly inclined forward direction during the forward strokes of the conveyer.

A pair of counterweights 41, 41 are provided to neutralize the tendency of the shaking action of the trough 11 and shovel 16 to move the base 13 along the ground. Each of said counterweights, as herein shown, is mounted on the inside of a side frame member 29, to move in the same angular direction as the reciprocating trough 11, but in opposite phase relationship with respect thereto. Each of said counterweights is mounted on a pair of parallel longitudinally spaced inclined guide tracks 43, 43 on parallel spaced supporting rollers 44, 44 journaled in said counterweight on transverse shafts 45, 45 and engaging opposite sides of said guide tracks. Said guide tracks, as herein shown, are mounted at their upper ends on opposite sides of the upper end of an upright bracket 46 which is mounted on and extends upwardly from the side frame member 29, and are connected at their lower ends to lugs 49, 49, which project downwardly from the side frame members 29, 29.

Downward and forward movement of the reciprocating trough section 11 along the guide tracks 34, 34 is limited by the reciprocating drive connections to said trough section, as will hereinafter more clearly appear as this specification proceeds. The shovel 16 is transversely pivoted to the forward end of said reciprocating trough section and overlaps the receiving end of said trough section at its discharge end. Said shovel, as herein shown, is pivotally connected to opposite upright sides of a U-frame 50 extending across and secured to the forward end of said reciprocating trough. Pivotal pins 51, 51 extend through said sides of said U-frame and through connecting ears of a connecting frame 52, which is secured to the bottom of said shovel, adjacent the rear end thereof, and extends thereacross beyond opposite sides thereof for pivotally connecting said shovel to said U-frame in discharge relation with respect to said reciprocating trough.

Pivotal movement of the shovel 16 with respect to the trough 11 is limited by means of a pair of laterally spaced compression springs 53, 53 encircling bolts 54, 54. Each of said bolts, as herein shown, is slidably mounted adjacent its upper end in a bracket 55, projecting upwardly and forwardly from the U-frame 50, and is slidably mounted adjacent its lower end in a laterally projecting portion 56 of the connecting frame 52. Said compression spring 53 encircling each bolt 54 is interposed between the under side of the bracket 55 and the upper side of said laterally projecting portion of said connecting frame.

The trough 11 and counterweight 41 are driven in opposite phase relation with respect to each other by means of a transverse rock shaft 60, journaled in suitable bearing supports provided on the base 13 and rocked by a shaker conveyer drive mechanism 59, which will be more fully described as this specification proceeds. Said rock shaft has a pair of laterally spaced depending rocking arms 61, 61 mounted thereon. Said rocking arms have operative connection with the counterweights 41, 41 through drive links 62, 62, pivotally connected to said rocking arms at one of their ends and pivotally connected to lugs 63, 63, depending from said counterweights, at their opposite ends.

The rocking shaft 60 also has a pair of laterally spaced upwardly extending rocking arms 64, 64, mounted thereon outside of the rocking arms 61, 61. Said rocking arms have driving connection with the trough section 11 through a pair of yieldable links 65, 65.

Each yieldable link 65, as herein shown, includes an eyebolt 66 pivotally connected to the arm 64 and projecting forwardly therefrom. Said eyebolt is threaded into a sleeve 67 having a collar 68 secured thereto, as by welding, and adapted to be abutted by the rear end of a pre-loaded compression spring 69. The opposite end of said spring encircles a stud 70, projecting rearwardly from a collar 71 formed integrally with a connecting ear 72. Said connecting ear extends between a bifurcated connecting portion 73 of the U-frame 50 and is pivotally connected thereto by means of a pivotal pin 74. Said spring is pre-loaded by means of a plurality of rods 75, 75 secured to said collar 71 at their forward ends, and extending rearwardly from said collar and through the collar 68. Said spring is adjustably tensioned by nuts threaded on the ends of said rods and abutting the rear end of the collar 68.

The length of the yieldable links 65, 65 does not vary during normal operation of the trough 11 and shovel 16. Said links, however, may be adjusted to compensate for weakened springs by removing the pins connecting the eyebolts 66, 66 to the rocking arms 64, 64 and adjustably turning said links in the threaded sleeves 67, 67. Said eyebolts may then be locked in position by the nuts threaded thereon, and the springs 69, 69 may be brought to the proper tension and the links may be brought to the required length by means of the nuts threaded on the ends of the rods 75, 75.

It should here be understood that the trough 11 is moved in a return direction through the rods 75, 75 and is moved in a forward direction through said compression springs. Said springs are so loaded and their strength is such that said yieldable links normally act as solid members, said springs being adapted to yield only when the forward end of the shovel 16 engages a solid obstruction, to prevent damage to said shovel and the drive mechanism therefor.

Referring now in particular to the inertia propelling device 15 and the means for reciprocably moving said device along the turntable 14 in various directions with respect thereto and in definite phase relations, said propelling device consists generally of a reciprocably driven propelling weight, which has certain parts of its own drive mechanism moving bodily therewith so as to add to its mass as an effective inertia propelling weight. Said drive mechanism is designed to give the propelling weight an unbalanced reciprocating motion essentially like that commonly employed in shaker conveyers. This shaker motion may perhaps be best described in simple terms as one in which the reciprocating weight is given a relatively quick reversal at the end of its forward stroke, and a relatively slow reversal at the end of its rearward stroke, so as to exert a resultant propelling force in a forward direction.

It will further be understood that the direction of the resultant impelling force can be reversed by providing means for interchanging the quick and slow reversals at the opposite ends of the strokes, i. e., by effecting the quick reversal at the end of the return stroke, and the slow reversal at the end of the forward stroke.

This unbalanced shaker motion may also be described in greater detail in terms of relative velocity or acceleration, thus: the propelling weight is gradually accelerated from the beginning of its forward stroke to a point of maximum velocity near the end of said stroke; is then quickly decelerated until it reaches the end of its forward stroke, is then quickly accelerated from the beginning of the return stroke until a point of maximum velocity is reached near the beginning of said return stroke, and is then slowly decelerated through the rest of the return stroke. The resultant impelling force is exerted in the forward direction; it is reversed by reversing the cycle or phase of accelerations and decelerations respectively, during the forward and reverse strokes.

As will hereinafter more fully appear, applicant provides his propelling weight with means for reversing the direction of the resultant impelling force, so that the entire base, including all the mechanism carried thereby, can be propelled along the ground selectively in either a forward or a rearward direction. Furthermore, by mounting the propelling weight on the turntable 14, the base can be propelled along the ground selectively in any desired angular direction.

As herein shown, the propelling device 15 includes a frame and housing 79 suitably mounted on said turntable for reciprocable slidable movement along fixed guide means, as will hereinafter more fully appear. Said frame forms a support and housing for a pair of reciprocating drive mechanisms generally indicated by reference characters 80, 80. Said reciprocating drive mechanisms, as herein shown, are each of a form of planetary drive mechanism of a type heretofore employed to reciprocably drive a shaker conveyer trough and are constructed and operate on principles similar to those disclosed in Patent No. 2,077,593, which issued to William W. Sloane on the 20 of April, 1937. Said drive mechanisms include a pair of laterally spaced gears 81, 81 keyed on vertical shafts 82, 82. Said shafts are journaled at their upper ends in a cover 83 for the frame and housing 79 and are each journaled at their lower ends in a cage 84 having a crank 85 depending therefrom and forming a drive member for the reciprocating drive mechanism. Each cage 84 is journaled at its upper end in a ball bearing 86, mounted in a cross supporting bridge 87 of said frame 79. Said crank 85 extends within a crank 88 and is secured thereto by means of a bolt 89. Said last mentioned crank is journaled at its lower end in a ball bearing 90, mounted in the bottom of said frame, coaxial with the vertical axis of the shaft 82.

A sun pinion 91 is mounted on the vertical shaft 82, just above its bearing support, in the cage 84 and meshes with a planetary pinion 92, journaled on a vertical shaft 93, mounted at its ends in said cage. Said planetary pinion meshes with an internal gear 96 which forms a reaction member for the drive mechanism. Said internal gear, as herein shown, is journaled on its outer periphery on the frame and housing 79 on a bearing 97, and is provided with an upwardly spaced annular portion encircling the bearing support for the ball bearing 86, which is journaled on an annular bearing 98 mounted in the upper part of said frame, just beneath the cover 83.

Each internal gear is provided with an integrally formed, inwardly extending, downwardly spaced gear sector 100. The teeth of said gear sectors mesh so that one internal gear will move with the other.

The means for reciprocably moving the reaction members 96, 96 about their axes in a definite phase relationship with respect to the cranks 88, 88, during each revolution thereof, to vary the angular velocities of said cranks in such a manner as to cause said cranks to reciprocably move the frame 79 in one direction along the turntable 14 at a gradually increasing velocity and to rapidly reverse the direction of movement of said frame and drive mechanism along said turntable, includes a forked rocking member 103 rocked by one of the cranks 88, and connected with one of said internal gears so as to rockingly move both of said internal gears together through the integrally formed meshing gear sectors 100, 100. (See Figures 13 and 14.)

The forked portion of the rocking member 103 extends along and has engagement with opposite sides of a block 104 which is journaled on one crank 88, which in Figure 14 is shown as being the right-hand crank. Said rocking member has a vertically extending boss 105 which is mounted on a vertical shaft 106, mounted at its lower end in a bracket 107 projecting rearwardly from the frame 79, and at its upper end in a vertically spaced bracket 108, projecting rearwardly from said frame. A rocking arm 109 extends laterally from said boss towards the drive mechanism 80, and as herein shown is disposed just beneath the bracket 108 and is formed integrally with said boss. A link 110 is pivotally connected between the furcation of a bifurcated end of said rocking arm by means of a pivotal pin 111. The other end of said link is pivotally connected to the internal gear 96, which in Figure 14 is shown as being the right-hand internal gear, by means of a pivotal pin 112. Thus, during each revolution of the crank 85 the forked member 103 will rock back and forth, which will cause reciprocable movement of the internal gears 96, 96, to vary the angular velocity of the cage 84 and the crank 88.

The drive mechanisms 80 are driven from a pair of meshing spur pinions 115, 115 which are driven from the spur gear 116 on a vertical shaft 117. Said shaft is journaled in the frame 79 adjacent its upper and lower ends and is driven from a pair of mitre gears 119, one of which is keyed on said shaft and the other of which is keyed on the rear end of a longitudinally extending shaft 120. Said longitudinal shaft is journaled in an end wall 121 of the frame 79 just forwardly of the bevel gear 119, and extends forwardly from said end wall and is journaled at its forward end in a forwardly spaced bearing support 122 of said frame. The shaft 120 extends through a hollow guide member 124 for the frame 79 and is driven from a bevel gear 125 through an extensible drive member 126. Said bevel gear is journaled on its hub in said hollow guide member, coaxial with said shaft (see Figure 12).

The hollow guide member 124 is provided with a depending boss 127 which is journaled in a bearing support 130 projecting upwardly from the base 13. The turntable 14 is mounted on the outer periphery of said bearing support and is coaxial with the axis of turning movement of said guide member. Flanges 124a, 124a at opposite sides of said guide member are adapted to be engaged by bearing strips 131, 131, extending along opposite inner side walls 132, 132 of the frame 79, to form a fixed guide for said frame during reciprocable movement thereof with respect to said turntable (see Figure 10). Said guide member is journaled adjacent its upper end on a boss 133, depending from a gear housing 134. Said gear housing is mounted on the cover 19 of the base 13 and is connected with a Y-shaped tie brace 135, which tie brace is secured to the front end wall of said base, at its spaced apart forward ends, and is secured to said gear casing at its rear end (see Figures 9 and 12).

The hub of the bevel gear 125 is internally splined and has a splined driving member 136 mounted therein and driven thereby. Said driving member is coaxial with the longitudinal shaft 120 and forms a part of the extensible drive member 126. The inner side of said driving member is spaced from the outer periphery of said longitudinal shaft 120, to permit rectilinear movement of said shaft with respect to said member. Said driving member has a pair of oppositely projecting portions 137, 137, to which are pivotally connected a pair of rotatable drive links 139, 139. Said drive links are of a semi-spiral formation and partially encircle said longitudinal shaft and have similar drive links 140, 140 pivotally connected thereto. The drive links 140, 140 are pivotally connected to a member 141 at their ends opposite their points of connection to drive links 139, 139, which member is slidably mounted on the longitudinal shaft 120. Drive links 142, 142 are pivotally connected to said last mentioned member at points spaced substantially 90° from the points of connection of the drive links 140, 140 to said member. Said drive links are pivotally connected to drive links 143, 143, which are connected at their free ends to a driving member 144 keyed on said longitudinal shaft, adjacent the bearing support 122, for driving said shaft as the frame 79 is reciprocably moved with respect to said gear. It will thus be observed that the drive links 139, 140, 142 and 143 form in effect two link mechanisms of the lazy tongs type, to provide an extensible driving connection between the turntable and the reciprocable frame 79 which affords minimum frictional losses during the reciprocation of said frame.

The bevel gear 125 is driven from a bevel gear 146 on the lower end of a vertical shaft 147. Said vertical shaft is journaled in the depending boss 133 of the gear housing 134, coaxial with the pivotal axis of the turntable 14. A bevel gear 150 is keyed on the upper end of said shaft and meshes with a bevel gear 151 on the forward end of an inclined longitudinally extending shaft 153. Said longitudinal shaft is journaled in the gear casing 154 just rearwardly of the bevel gear 151, and is journaled adjacent its opposite end in a gear casing 154 which is mounted on the top of the cover 19, for the base 13. A hollow tube 155 encircles said shaft and is connected at its ends to the gear housings 134 and 154. A bevel gear 156 is keyed on the rear end of said longitudinal shaft and meshes with and is driven from a bevel gear 157 keyed on the transverse shaft 21.

The linkage connection from the cranks 85, 85 to the turntable 14, to cause the reciprocating drive mechanism and frame 79 to reciprocably move with respect to said turntable and act as a propelling weight to move the base 13 along the ground, includes a pair of drive links 160, 160, each of which links is journaled on one of the cranks 88 on ball bearings 161, 161 on one of its ends (see Figure 10). The connection from each drive link 160 to the turntable 14 is substantially the same, so one only will herein be described in detail.

The end of the drive link 160 opposite from the crank 88 is bifurcated and the furcations thereof extend along opposite sides of and are pivotally connected to an inwardly extending central portion 162 of a stroke control member 163, by means of a pivotal pin 164 disposed eccentric of the axis of rocking movement of said stroke control member, for rocking said stroke control member. Said stroke control member has a lower depending boss 165 spaced from the central portion thereof, which is journaled in the bottom of the frame 79, on a bearing 166. It also has an upwardly projecting bearing boss 167 spaced from said central portion which is journaled in a cover 168 of said frame 79 (see Figure 17).

The stroke control member 163 is provided with a longitudinally extending slot 169, within which is slidably mounted a stroke control block 170 on parallel spaced guide rods 171, 171, mounted in said stroke control member and extending along opposite sides of and into said slot. Said stroke control block has a vertical pin 174 mounted therein, which has a pair of parallel spaced stroke control links 175 pivotally mounted thereon, on opposite sides of said block. The ends of said pin project beyond the upper and lower sides of said stroke control links and have the bifurcated end of a link 176 pivotally connected thereto. The end of said link opposite from said pin is pivotally connected to an arm 177 of a bell crank 178, for rocking said bell crank upon rocking movement of said stroke control member. The other arm of said bell crank has a link 179 pivotally connected thereto, which is pivotally connected to the turntable 14.

The center of the slot 169 intersects the axis of rocking movement of the stroke control member 163 so that when the stroke control block 170 is in a central position with respect to said slot and the vertical axis of its pin 174 is coaxial with the axis of rocking movement of said stroke control member, the link 176 will exert no driving action; and when the blocks of both stroke control members are in this position, the frame 79 will remain stationary on the turntable 14 during rotation of the cranks 88, 88. When said stroke control block is at either side of the pivotal axis of said stroke control member, the link 176 will rock the bell crank 178 to reciprocably move said frame and drive mechanism along said turntable. In the form shown, the linkage arrangement is such that when said stroke control block is in an extreme rearward position in its slot 169, the maximum propelling action of said frame and drive mechanism will be exerted during its forward stroke or movement, and said frame and drive mechanism will exert a maximum forward propelling force on the base 13. In a like manner, said frame and drive mechanism will exert a maximum propelling force on said base in a rearward direction when said stroke control block is in an extreme forward position in its slot 169. It should here be understood that any lesser propelling forces may be obtained by positioning said block intermediate the ends of said slot.

The two drive mechanisms are thus connected to the turntable 14 at spaced apart points, so that upon rotation of the cranks 88, 88 and proper positioning of the stroke control block 170 in the slot 169 of the stroke control member 163, the bell cranks 178, 178 will be rocked through the drive links 160, 160, stroke control members 163, 163 and the links 176, 176, to reciprocably move the frame 79 and said drive mechanism along the turntable 14 through the parallel spaced links 179, 179, it being understood that the blocks 170, 170 may be independently moved along their associated stroke control members, to independently control the drive action of each reciprocable drive mechanism.

Referring now to the means under control of the operator, for moving the stroke control block 170 along the slot 169 and holding it in the desired position in said slot, the stroke control links 175, 175 are pivotally connected at their ends opposite said stroke control block to opposite sides of a threaded block or nut 180 mounted on a threaded shaft 181 (see Figure 17). The pitch of the threads of said shaft and nut is such as to cause said nut to be locked in position on said shaft upon the stopping of rotation thereof. Said nut 180 has a slotted upwardly projecting stud 183 on which is pivotally mounted the upper stroke control link 175. The slotted portion of said boss is engaged by a guide 184 secured to and depending from the top of a housing and guide frame 185 for the stroke control mechanism, to hold said nut in an upright position during movement along said threaded shaft (see Figure 19).

The threaded shaft 181 is rotatably driven from a fluid motor 186 connected with a planetary gear reduction device which includes a sun gear 187 mounted on an inwardly projecting hub 188 of a flywheel 189. Said flywheel is provided to level off the power load on the stroke control mechanism and to keep the fluid motor running at a high rate of speed, and is mounted on a shaft 190 for said fluid motor.

A casing 191 having an internal gear 192 formed integral therewith is journaled on the hub of said flywheel on a ball bearing 194. Said internal gear is meshed with a planetary pinion 195 meshing with said sun and internal gears and mounted on a cage 196, for orbital movement about said internal gear. The cage 196 is provided with an inwardly extending integrally formed shaft 197 which projects into a socket 198 formed in the rear end of the threaded shaft 181, for driving said shaft from said cage.

A friction band 199 is yieldably engaged with the outer periphery of the casing 191 and is provided to hold the casing 193 and the internal gear 192 from rotation, but to permit said casing and internal gear to turn when the threaded block 180 reaches either end of its travel along the threaded shaft 181.

A yieldable shock absorbing means is adapted to act against each stroke control member 163, to take up any back lash on the reciprocable driving mechanisms and to absorb any shocks which may be imparted from the links 179, 179 to the drive gears for said reciprocable driving mechanisms. Said shock absorbing mechanism for each drive mechanism, as herein shown, includes a spring pressed plunger 200, which engages a lug 201 on the outer side of the stroke control member 163. Said plunger is slidably mounted in a pair of spaced apart ears 202, 203 formed integrally with the frame 79 and projecting laterally therefrom. A compression spring 204 is mounted on said plunger in the space between said ears and is interposed between a flanged collar 205 abutting the ear 202 and a flanged collar 206 abutting a shouldered portion 207 of said plunger, so said spring will yield when said stroke control member moves in a direction which in Figure 10 is shown as being a counterclockwise direction. The drive link 160 thus rocks the stroke control member against the compression spring 204 during its forward stroke and said compression spring tends to move said stroke control member in the direction of movement of said link during its return stroke, to take up any back lash in the links, rocking members and gears of the drive mechanism and absorb any shocks that might be imparted to the drive mechanism by the links 179, 179 upon reversal in the direction of movement of the drive mechanism along the turntable 14.

Figure 25:
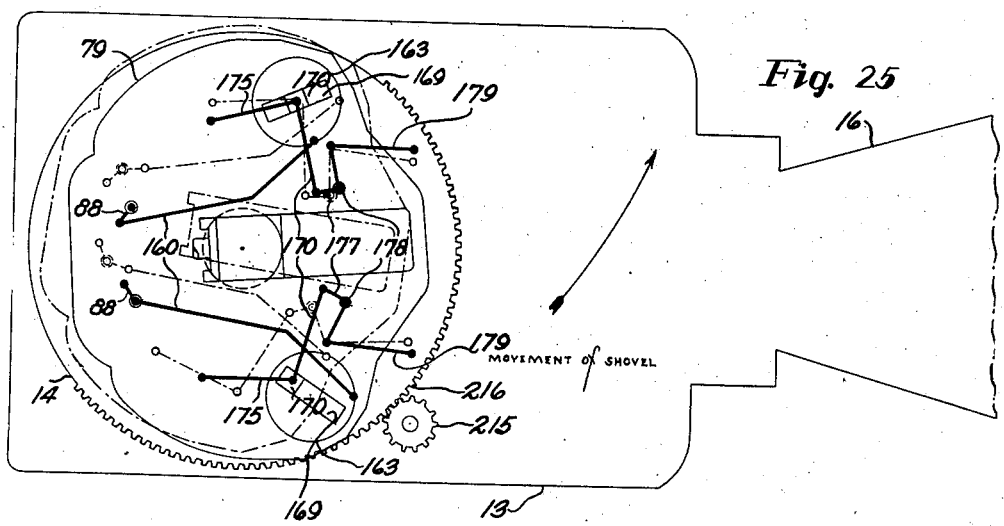

It may be seen from the foregoing that the stroke control devices for each drive mechanism are independently operable so that one reciprocable drive mechanism only may be used to move the frame 79 and drive mechanism associated therewith along the turntable 14, as indicated in Figure 25. When this is done, only one of the two link connections 179 will exert a reactive force on the turntable, so that the reciprocable movement of the drive mechanism will impose an unbalanced thrusting action toward one side of said turntable. This will tend to swing the drive mechanism angularly about its guiding member 124, resulting in a movement of the turntable and base in a diagonal direction. Said drive mechanisms may also be so arranged that one drive mechanism will impart a maximum propelling force on one side of the turntable in one direction, and the other drive mechanism will at the same time impart a maximum propelling force on the opposite side of said turntable in an opposite direction, to swing or rotate the loading device toward one side or the other.

The angle at which the propelling force is exerted on the base 13 by the frame 79 and the drive mechanisms mounted thereon is also controlled by the turntable 14. Said turntable is turned by a fluid motor 211 having driving connection with said turntable through a worm 212 directly connected with a shaft 213 of said motor, a worm gear 214, driven by said worm, and a spur gear 215 driven therefrom and meshing with gear teeth 216, cut in the outer periphery of said turntable (see Figures 9 and 11).

The drive to the reciprocating trough 11 includes a crank 217 driven from the transverse shaft 21 by a gear train generally indicated by reference character 218 (see Figures 9 and 20). Said crank and gear train, as herein shown, are mounted on the top of the cover 19. A connecting rod 219 is journaled on said crank and extends longitudinally forward therefrom. The forward end of said connecting rod is pivotally connected between the furcations of a bifurcated connecting ear 220 of a stroke control member 221, by means of a pivotal pin 222. Said stroke control member is provided to permit reciprocable movement of said trough to be synchronized with reciprocable movement of the propelling device 15. Said stroke control member operates on principles similar to the stroke control member 163 and is journaled at its ends in opposite side walls 223 and 224 of a housing and frame, projecting upwardly from and formed integrally with the cover 19 for the base 13 (see Figure 21). Said stroke control member is provided with a longitudinally extending slot 225, within which is slidably mounted a stroke control block 226. A pair of stroke control links 227, 227 extend along opposite sides of said block and are pivotally connected thereto by means of a pivotal pin 229. The stroke control links are pivotally connected at their ends opposite the block 226 to another block 230 mounted on a threaded shaft 231. Said threaded shaft is rotatably driven through a frictionally controlled planetary geared reduction device 233, by means of a fluid motor 234. Said planetary is similar to that used for controlling the stroke of the propelling device, so will not herein be shown or described in detail.

Since there is no need for reversing the conveying action of the trough 11, movement of the block 226 along the slot 225 in one direction is limited to a position where the center of the pin is coaxial with the center of rocking movement of said stroke control member, at which time there will be no reciprocable movement of said trough. The stroke of said trough will be lengthened and the conveying action of said trough increased as said block is moved away from said last mentioned position to an extreme forward position in said slot.

The pin 229 has a link 235 pivotally connected to each end thereof. Said links depend from said pin and are pivotally connected at their lower ends to a rocking arm 236. Said rocking arm is secured to the transverse shaft 60, for rocking said shaft and reciprocably driving the trough 11 in the hereinbefore described manner.

Fluid under pressure may be supplied to the fluid motors 186, 186, 211 and 234 and to the fluid cylinder 32, through a suitable system of pipes and control valves which are not herein shown or described since they form no part of my present invention. Pressure is effected in the system by means of a fluid pump 237 driven from the opposite end of the transverse shaft 21 from the motor 17. The fluid valves for controlling the admission and release of pressure from said motors and fluid cylinder may be controlled by means of a control means such as a push button control remote from the machine and indicated generally by reference character 239 in Figure 1. Said push button control is herein shown as being connected to the machine by means of an electric cable 240. Said control valves and push button control are no part of my present invention, so will not herein be shown or described in detail.

Figure 22:
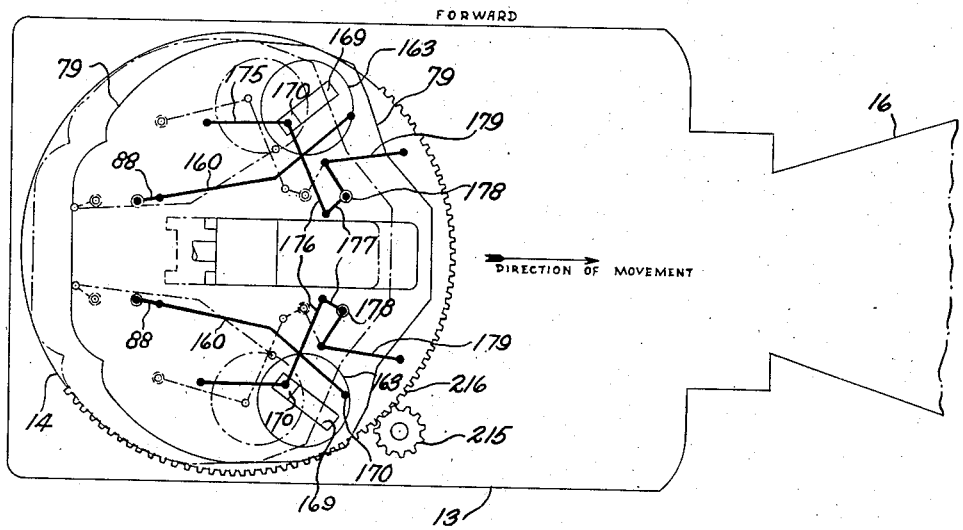

Referring now in particular to Figures 22 to 25 inclusive, diagrammatically illustrating the various positions of the inertia device and the linkage connections for reciprocably moving said inertia device with respect to the turntable, Figure 22 shows the stroke control blocks 170 as being adjusted in extreme rear positions in the guide slots 169, 169 in the stroke control members 163, 163. When the linkage connections are in the position shown in this figure, the inertia device consisting of the frame 79 and the reciprocable drive mechanisms mounted thereon, will be given a relatively quick reversal at the forward end of its stroke and its effective propelling force will be exerted in a forward direction. This will cause said inertia device to move said base in a forward direction.

Figure 23:
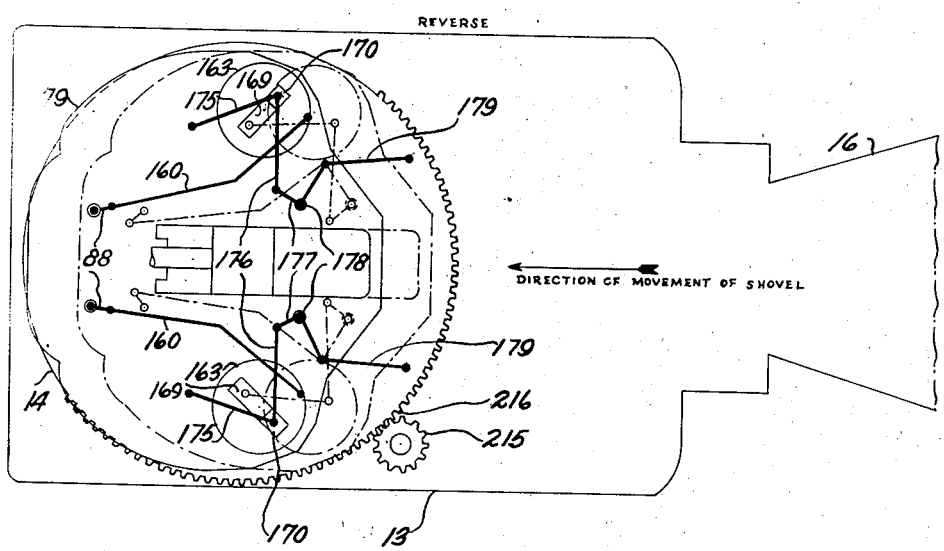

In Figure 23 the stroke control blocks 170, 170 are shown as being adjusted into position at the extreme forward ends of the slots 169, 169 in the stroke control members 163, 163. When said blocks are in this position, the propelling device will be given a relatively quick reversal at the return end of its stroke. This will cause said propelling device to propel the base 13 in a rearward direction, and to withdraw the shovel 16 from the coal.

Figure 24:
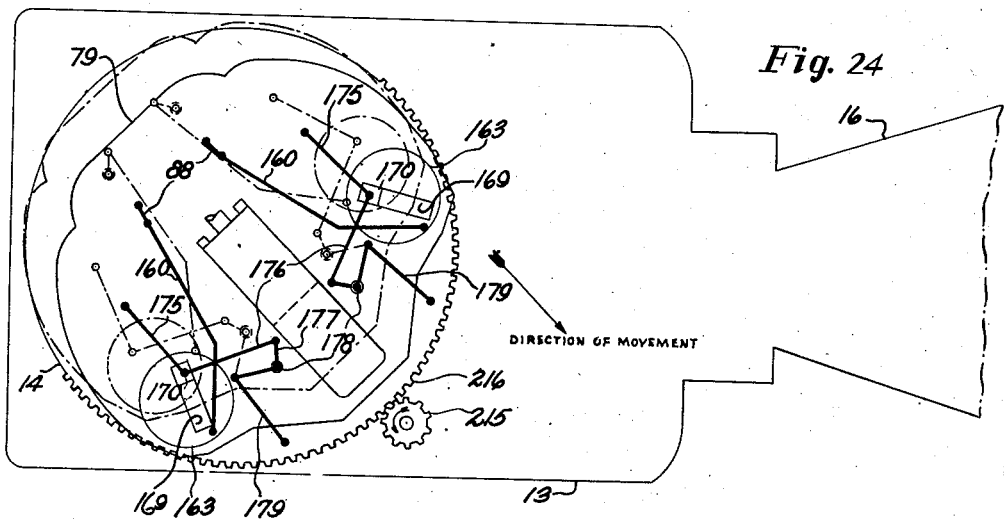

In Figure 24 the truntable 14 has been turned to the right to position the inertia device at an angle to the base. The stroke control blocks 170, 170 are shown as being adjusted in extreme rear positions in the slots 169, 169. When said stroke control blocks and turntable are in this position, said inertia device will propel the base 13 along the ground in a diagonal direction to the right.

In Figure 25 the left-hand stroke control block 173 is positioned in a neutral position in its slot 169 so the center of the pin 174 is coaxial with the pivotal axis of said block. When in this position, the associated stroke control member 163 will have no driving effect on the link 176 and bell crank 178. The opposite stroke control block 173 is shown as being positioned in an extreme rear position in its slot 169. This will cause angular movement of the propelling device with respect to the turntable 14 about the pivoted guide member 124 and the impelling force of said propelling device will be exerted in a forward and diagonal direction towards the left. This will cause movement of the base and loading device in a diagonal direction to the left.

When it is desired that the turning force of the propelling device in one direction or another be changed to change the axis about which it turns the base, to coincide more nearly with the center of the machine, one linkage connection may be so arranged that the drive mechanism associated therewith will impart an impelling force in a forward direction and the other linkage connection may be so arranged that its associated drive mechanism will impart an impelling force in a reverse direction, but at the same time as said first drive mechanism.

It may be seen from the foregoing that various combinations and arrangements of the stroke control blocks 170, 170 in the slots 169, 169 may be attained, for causing the base 13 to move along the ground in any desired direction so that the loading device may readily be manipulated for picking up material along a working face of a mine and from the extreme corners thereof, and that the direction of the propelling forces imparted to the base may also be controlled by the turntable 14, to more accurately control movement of the loading device along the ground.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a propelling device of the class described, a base adapted to slidably move along the ground, and inertia propelling means slidably mounted on said base for moving said base along the ground, including a reciprocating drive mechanism and a linkage connection from said drive mechanism to said base, providing a propelling connection therebetween.

2. In a propelling device of the class described, a base adapted to slidably move along the ground, and inertia propelling means slidably mounted on said base and reciprocably driven with respect thereto for moving said base along the ground including a reciprocating drive mechanism, a linkage connection from said drive mechanism to said base, providing a propelling connection therebetween, and control means for said linkage connection, to change the direction of the impelling force imparted to said base by said drive mechanism.

3. In a propelling device of the class described, a base adapted to slidably move along the ground, and inertia propelling means slidably mounted on said base for moving said base along the ground, including a reciprocating drive mechanism including a pair of spaced rocking members, linkage connections from said rocking members to said base, and means for controlling rocking movement of said rocking members to vary the effectiveness of the impelling forces transmitted to said base through said rocking members respectively, and thereby cause movement of said base along the ground in various desired directions.

4. In a propelling device of the class described, a base adapted to slidably move along the ground, and inertia propelling means slidably mounted on said base for moving said base along the ground including a reciprocating drive mechanism including a pair of rotatable cranks, a linkage connection from each of said cranks to said base and to provide a propelling connection therebetween, said linkage connections including a pair of rocking members driven by said cranks, and means in said linkage connection for controlling rocking movement of said rocking members, to cause said drive mechanism to exert maximum propelling forces on said base in a forward or return direction.

5. In a propelling device of the class described, a base adapted to slidably move along the ground, and inertia propelling means slidably mounted on said base for slidably moving said base along the ground including a reciprocating drive mechanism having a pair of rotatable cranks, and a separate linkage connection from each of said cranks to said base to provide a propelling connection therebetween, said linkage connections each including a rocking member and independent control means for controlling rocking movement of said rocking members, and arranged to change the resultant direction of the propelling forces of said drive mechanism along said base from the forward to the return direction, to cause said drive mechanism to move said base in reverse directions, or in angular directions to the normal direction of reciprocation of said drive mechanism.

6. In a propelling device of the class described, a base adapted to slidably move along the ground, and inertia propelling means slidably mounted on said base, for moving said base along the ground including a pair of reciprocating drive mechanisms, each of which drive mechanisms has a crank driven at a variable angular velocity, a rocking member, a linkage connection from said crank to said rocking member, for rocking said rocking member, and a linkage connection from said rocking member to said base, said last mentioned linkage connections of said drive mechanisms being connected to said base at spaced apart points, for transmitting impelling forces from said drive mechanisms to said base.

7. In a propelling device of the class described, a base adapted to slidably move along the ground, and inertia propelling means slidably mounted on said base for moving said base along the ground including a frame slidably mounted on said base, a pair of interconnected reciprocating drive mechanisms carried by said frame, each of which drive mechanisms includes a crank driven at a variable angular velocity, a rocking member, a linkage connection from said crank to said rocking member, for rocking said rocking member, and a linkage connection from said rocking member to said base, said last mentioned linkage connections being connected to said base at spaced apart points to provide a propelling connection between said rocking member and said base, and manually operable control means for controlling rocking movement of said rocking members, to change the resultant direction of the propelling forces imparted by said frame as it reciprocably moves along said base, from the forward to the return direction, to control the direction of movement of said base along the ground.

8. In a propelling device of the class described, a base adapted to slidably move along the ground, and inertia propelling means slidably mounted on said base for moving said base along the ground comprising a frame slidably mounted on said base, a pair of shaker conveyer drive mechanisms mounted on said frame, each of which includes a crank driven at a variable angular velocity, a rocking member, a linkage connection from said crank to said rocking member, for rocking said rocking member, a linkage connection from said rocking member to said base, said last mentioned linkage connections being connected to said base at spaced apart points to provide a propelling connection between said rocking member and said base, and separate independently operable control means for each of said rocking members, for independently varying the direction of the resultant propelling forces imparted to said base by said frame and drive mechanisms to control the direction of movement of said base along the ground.

9. In a propelling device, a base slidably movable along the ground, a reciprocating drive mechanism slidably mounted on said base for reciprocable movement with respect thereto, for moving said base along the ground, said drive mechanism including a frame, a crank rotatably mounted thereon, a rocking member rocked thereby, a linkage connection from said rocking member to said base to provide a propelling connection therebetween, and a yieldable member having engagement with said rocking member and acting in a direction to exert a force on said rocking member in a direction opposite to which it is rocked by said crank, during movement of said rocking member in one direction, and to act in the direction of movement of said rocking member during movement of said rocking member in an opposite direction, to take up the thrusts imparted to said drive mechanism upon reversal in the direction of movement of said frame along said base.

10. In a propelling device, a base slidably movable along the ground, a reciprocating drive mechanism slidably mounted on said base for reciprocable movement with respect thereto, for moving said base along the ground, said drive mechanism including a frame, a crank rotatably mounted thereon, a rocking member rocked thereby, a second rocking member, a link connecting said rocking members together, another link connecting said second rocking member to said base, to provide a propelling connection between said second rocking member and said base, and a yieldable member having engagement with said first rocking member in a direction to oppose rocking movement thereof during movement of said rocking member in one direction and to exert a force in the direction of movement of said rocking member when said rocking member reverses its direction of rocking movement, to take up the thrusts imparted to said drive mechanism upon reversal of the direction of movement of said frame along said base.

11. In a propelling device, a base slidably movable along the ground, a turntable on said base, inertia propelling means slidably mounted on said turntable and reciprocably driven with respect thereto, for slidably moving said base along the ground, and means operable under manual control for turning said turntable, to control the direction of movement of said base along the ground.

12. In a propelling device, a base slidably movable along the ground, a turntable on said base, inertia propelling means including a reciprocable drive mechanism slidably mounted on said turntable, and a connection from said drive mechanism to said turntable, to permit said propelling means to reciprocably move with respect to said turntable in a definite cycle, for slidably moving said base along the ground due to the inertia of said propelling means.

13. In a propelling device, a base slidably movable along the ground, a turntable on said base, inertia propelling means slidably mounted on said turntable and reciprocably driven with respect thereto, for slidably moving said base along the ground, means operable under manual control for turning said turntable, to control the direction of movement of said base along the ground, and means on said turntable to reverse the resultant direction of the propelling forces exerted by said reciprocating means to reverse the direction of movement of said base.

14. In a propelling device, a base slidably movable along the ground, a turntable on said base, inertia propelling means including a frame and a reciprocating drive mechanism slidably mounted on said turntable, and reciprocably driven with respect thereto, for slidably moving said base along the ground by the inertia of said propelling means, said drive mechanism including a crank rotatably mounted on said frame, a rocking member rocked thereby, and a linkage connection from said rocking member to said turntable for providing a propelling connection therebetween.

15. In a propelling device, a base slidably movable along the ground, a turntable on said base, inertia propelling means including a frame and a reciprocating drive mechanism slidably mounted on said turntable and reciprocably driven with respect thereto for slidably moving said base along the ground, said drive mechanism including, a crank rotatably mounted on said frame, a rocking member rocked thereby, and a linkage connection from said rocking member to said turntable for providing a propelling connection therebetween, and means for controlling the cycle of rocking movement of said rocking member, to reverse the resultant direction of the propelling force exerted by said propelling means along said turntable and thereby reverse the direction of movement of said base along the ground.

16. In a propelling device, a base slidably movable along the ground, a turntable on said base, inertia propelling means including a frame and a reciprocating drive mechanism slidably mounted on said turntable and reciprocably driven with respect thereto for slidably moving said base along the ground, a pair of cranks rotatably mounted on said frame, a pair of rocking members rocked thereby, and linkage connections connecting said rocking members to said turntable at spaced apart points, for providing a propelling connection between said rocking member and said turntable.

17. In a propelling device, a base slidably movable along the ground, a turntable on said base, a reciprocating inertia drive mechanism slidably mounted on said turntable and reciprocably driven with respect thereto for slidably moving said base along the ground and including a frame, a crank rotatably mounted thereon, a rocking member rocked thereby, a linkage connection from said rocking member to said turntable, to provide a propelling connection therebetween, and means to take up the thrusts imparted to said drive mechanism through said linkage connection and rocking member, upon reciprocation thereof including a yieldable member having engagement with said rocking member and adapted to exert a force on said rocking member in a direction opposite to which it is rocked by said crank during its forward strokes, and in its direction of rocking movement during its return strokes.

18. In a propelling device, a base slidably movable along the ground, a turntable on said base, a reciprocating inertia drive mechanism slidably mounted on said turntable and reciprocably driven with respect thereto, for slidably moving said base along the ground and including a frame, a crank rotatably mounted thereon, a rocking member rocked thereby, a second rocking member, a link connecting said rocking members together, to rock one from the other, another link connecting said second rocking member to said turntable to provide a propelling connection therebetween, and means to take up the thrusts imparted to said drive mechanism through said links and rocking members upon reciprocation thereof including a spring pressed plunger having engagement with said first mentioned rocking member and acting in a direction to urge said rocking member in a direction opposite to which it is rocked by said crank during one stroke and in the direction it is rocked by said crank during its other stroke.

19. In a shaker conveyer loading device, a base slidable along the ground, a turntable on said base, a trough mounted on said base for reciprocable movement with respect thereto, a shovel projecting from the forward end of said trough, a motor on said base, means on said base driven by said motor, for reciprocably driving said trough, to cause said shovel to pick up material from the ground, inertia propelling means slidably mounted on said turntable and reciprocably driven along said base by said motor, for slidably moving said base along the ground, means operable under manual control, for turning said turntable, for controlling the direction of movement of said base, and means for reversing the direction of the propulsive action of said propelling means, to reverse the direction of movement of said base along the ground.

20. In a shaker conveyer loading device, a base slidable along the ground, a turntable on said base, a trough mounted on said base, for reciprocable movement with respect thereto, a shovel projecting from the forward end of said trough, a motor on said base, means on said base driven by said motor, for reciprocably driving said trough, to cause said shovel to pick up material from the ground, inertia propelling means slidably mounted on said turntable and reciprocably driven by said motor, for slidably moving said base along the ground including a frame having a shaker conveyer driving mechanism mounted thereon, and a linkage connection between said drive mechanism and said turntable, to provide a propelling connection therebetween.

21. In a shaker conveyer loading device, a base slidable along the ground, a turntable on said base, a trough mounted on said base, for reciprocable movement with respect thereto, a shovel projecting from the forward end of said trough, a motor on said base, means on said base driven by said motor, for reciprocably driving said trough, to cause said shovel to pick up material from the ground, inertia propelling means slidably mounted on said turntable and reciprocably driven by said motor, for slidably moving said base along the ground including a frame having a shaker conveyer driving mechanism mounted thereon, a linkage connection between said drive mechanism and said turntable, to provide a propelling connection therebetween, and the drive connection from said motor to said drive mechanism including an extensible drive member supported on said turntable at one of its ends and on said frame at its opposite end.

22. In a shaker conveyer loading device, a base slidable along the ground, a turntable on said base, a trough mounted on said base for reciprocable movement with respect thereto, a shovel projecting from the forward end of said trough, a motor on said base, means on said base driven by said motor, for reciprocably driving said trough, to cause said shovel to pick up material from the ground, propelling means slidably mounted on said turntable and reciprocably driven by said motor, for slidably moving said base along the ground, including a frame, a pair of shaker conveyer drive mechanisms mounted on said frame and including a pair of rocking members, a pair of links for connecting said rocking members with said turntable at spaced apart points, means for changing the resultant direction of the propelling action of said propelling means to control movement of said base along the ground and to reverse the direction of movement of said base along the ground, and means for turning said turntable to change the direction of the forces imparted to said base by said propelling means, and cause said base to move along the ground in a diagonal direction.

23. In a propelling device, a reciprocative inertia drive mechanism including a pair of driven cranks, and planetary drive devices, each of said cranks having a rotatable reaction member cooperating therewith for varying the angular velocity of its respective driven crank, and means operatively connecting said reaction members for rocking movement in unison so as to maintain said driven cranks in uniform phase relationship.

24. In a propelling device of the class described, a base adapted to slidably move along the ground, an inertia propelling weight, a fixed guide member on said base for permitting reciprocable movement of said weight at varying angles to said base, means for imparting a reciprocable propelling movement to said weight to slidably move said base along the ground, including a linkage connection from said weight to said base, and control means for said linkage connection to change the direction of the impelling forces imparted to said base by said weight.

25. In a propelling device of the class described, a base adapted to slidably move along the ground, an inertia propelling weight, a fixed guide member on said base for permitting reciprocable movement of said weight at varying angles to said base, means for imparting a reciprocable propelling movement to said weight, including a pair of rocking members, linkage connections from said rocking members to said base connected to the latter at opposite sides of the normal path of movement of said propelling weight, and means for independently controlling the rocking movement of said rocking members to vary the path of reciprocable movement of said propelling weight relative to said base, and thereby cause movement of said base along the ground in various desired directions.

26. In a propelling device of the class described, a base adapted to slidably move along the ground, an inertia propelling weight, a fixed guide member on said base permitting reciprocable movement of said weight at varying angles to said base, means for imparting a reciprocable propelling movement to said weight, including a pair of rotatable cranks, a linkage connection from each of said cranks to said base, said linkage connections including a pair of rocking members driven by said cranks, and means in said linkage connections for controlling rocking movement of said rocking members to cause said propelling weight to exert maximum propelling forces on said base in a forward or return direction.

27. In a propelling device of the class described, a base adapted to slidably move along the ground, an inertia propelling weight, a fixed guide member on said base permitting reciprocable movement of said weight at varying angles to said base, means for imparting a reciprocable propelling movement to said weight to slidably move said base along the ground, including a pair of rotatable cranks, and a separate linkage connection from each of said cranks to said base at laterally spaced points, said linkage connections each including a rocking member and independent control means for controlling rocking movement of said rocking members, and arranged to vary the resultant propelling force exerted by said propelling weight along said guides to cause said base to move selectively in reverse directions, or at angular directions to the longitudinal center line of said base.

28. In a propelling device of the character described, a base slidably movable along the ground, a turntable on said base, an inertia propelling weight, a guide member having fixed relation to said turntable, permitting reciprocable movement of said weight at varying angles to said turntable, means for imparting a propelling reciprocating motion to said propelling weight to slidably move said base along the ground, and means operable under manual control for turning said turntable, to control the direction of movement of said base along the ground.

29. In a propelling device of the character described, a base slidably movable along the ground in various directions, a turntable on said base, an inertia propelling weight, a guide member for said propelling weight having fixed relation to said turntable, means for imparting a propelling reciprocating motion to said propelling weight relative to said turntable, and linkage means providing a propelling connection between said propelling weight and said turntable, including a pair of rocking members connected to said turntable at spaced points on opposite sides of the normal path of movement of said propelling weight.

30. In a propelling device of the character described, a base slidably movable along the ground in various directions, a turntable on said base, an inertia propelling weight, a guide member for said propelling weight having fixed relation to said turntable, means for imparting a propelling reciprocating motion to said propelling weight relative to said turntable, and extensible linkage means providing a propelling connection between said propelling weight and said turntable, including a pair of rocking members connected to said turntable at spaced points on opposite sides of the normal path of movement of said propelling weight, and independent means for controlling rocking movement of said rocking members to vary the angle of the effective propelling force of said propelling weight relative to said turntable, and thereby cause movement of said turntable and base in various directions.

31. In a propelling device of the character described, a base slidably movable along the ground in various directions, a turntable on said base, an inertia propelling weight, a guide member for said propelling weight having fixed relation to said turntable, means for imparting a propelling reciprocating motion to said propelling weight relative to said turntable, and extensible linkage means providing a propelling connection between said propelling weight and said turntable, including a pair of rocking members connected to said turntable at spaced points on opposite sides of the normal path of movement of said propelling weight, and means for controlling rocking movement of said rocking members, to reverse the direction of the propelling forces imparted by said weight through said linkage means to said turntable.

32. In a propelling device of the character described, a base slidably movable along the ground in various directions, a turntable on said base, inertia propelling mechanism mounted on said turntable for reciprocable movement in a fixed horizontal path, power means on said base, a rotating driving connection between said power means and said propelling mechanism including an extensible linkage mechanism of the lazy tongs type.

33. In a propelling device of the character described, a base slidably movable along the ground in various directions, a turntable on said base, inertia propelling means including a reciprocable drive mechanism guided for reciprocable movement in a fixed horizontal path on said turntable, power means on said base, and drive connections between said power means on said base and said reciprocable drive mechanism on said turntable, including a rotatable drive member coaxial with said turntable, and a rotatable extensible lever mechanism of the lazy tongs type operatively connected at one end to said rotatable drive member and at the other end to said reciprocable drive mechanism.

34. In a propelling device of the class described, a base adapted to slidably move along the ground, a turntable on said base, an inertia propelling weight, a guide member fixed on said base concentrically with said turntable, permitting reciprocable movement of said weight along said turntable at varying angles thereto, and means for imparting reciprocable propelling movement to said propelling weight to slidably move said base along the ground.

35. In a propelling device, a base slidably movable along the ground, a turntable on said base, inertia propelling means including a frame and a reciprocating drive mechanism slidably mounted on said turntable and reciprocably driven with respect thereto for slidably moving said base along the ground, a pair of cranks rotatably mounted on said frame, a pair of rocking members rocked thereby, linkage connections, connecting said rocking members to said turntable at spaced apart points, for providing a propelling connection between said rocking member and said turntable, and means for independently controlling movement of said linkage connections, to reverse the resultant direction of the propelling force exerted by said propelling means along said base, to reverse the direction of movement of said base along the ground, and to render either one of said linkage connections inoperative, to cause said propelling means to exert unbalanced propelling forces on opposite sides of said turntable, for selectively moving said base in diagonal directions.

JOHN H. HOLSTEIN.